United States Patent
Hwang et al.

(10) Patent No.: US 10,887,924 B2
(45) Date of Patent: *Jan. 5, 2021

(54) METHOD FOR PERFORMING RANDOM ACCESS PROCEDURE

(71) Applicant: LG ELECTRONICS INC., Seoul (KR)

(72) Inventors: Daesung Hwang, Seoul (KR); Yunjung Yi, Seoul (KR); Suckchel Yang, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 16/411,790

(22) Filed: May 14, 2019

(65) Prior Publication Data
US 2019/0268948 A1    Aug. 29, 2019

Related U.S. Application Data

(63) Continuation of application No. 15/995,757, filed on Jun. 1, 2018, now Pat. No. 10,327,266, which is a
(Continued)

(51) Int. Cl.
*H04W 74/08* (2009.01)
*H04W 76/15* (2018.01)
(Continued)

(52) U.S. Cl.
CPC ..... *H04W 74/0833* (2013.01); *H04W 52/146* (2013.01); *H04W 52/50* (2013.01);
(Continued)

(58) Field of Classification Search
CPC ............. H04W 74/0833; H04W 76/15; H04W 52/146; H04W 52/50
(Continued)

(56) References Cited

U.S. PATENT DOCUMENTS 6,795,412 B1 * 9/2004 Lee ............... H04W 36/16
370/329
9,265,069 B2  2/2016 Ahn et al.
(Continued)

FOREIGN PATENT DOCUMENTS

CN   102318400   1/2012
CN   103190103   7/2013
(Continued)

OTHER PUBLICATIONS

PCT International Application No. PCT/KR2014/009723, International Search Report dated Jan. 14, 2015, 1 page.
(Continued)

*Primary Examiner* — Christopher R Crompton
(74) *Attorney, Agent, or Firm* — Lee Hong Degerman Kang Waimey

(57) ABSTRACT

One embodiment of the present specification provides a method for performing a random access procedure. The method can comprise the steps of: generating a random access preamble to a first cell; generating a random access preamble to a second cell; determining whether the random access preamble to the first cell and the random access preamble to the second cell are triggered so as to be simultaneously transmitted in the same subframe; selecting the random access preamble to any one of the cells according to a pre-set priority when triggered so as to be simultaneously transmitted; and transmitting the any one selected random access preamble.

14 Claims, 16 Drawing Sheets

Related U.S. Application Data continuation of application No. 15/782,323, filed on Oct. 12, 2017, now Pat. No. 10,009,932, which is a continuation of application No. 15/037,657, filed as application No. PCT/KR2014/009723 on Oct. 16, 2014, now Pat. No. 9,826,554.

(60) Provisional application No. 61/906,398, filed on Nov. 19, 2013, provisional application No. 61/932,208, filed on Jan. 27, 2014, provisional application No. 62/060,540, filed on Oct. 6, 2014.

(51) Int. Cl.
| | |
|---|---|
| *H04W 52/14* | (2009.01) |
| *H04W 52/50* | (2009.01) |
| *H04W 74/04* | (2009.01) |
| *H04W 52/24* | (2009.01) |
| *H04W 52/34* | (2009.01) |
| *H04W 84/04* | (2009.01) |

(52) U.S. Cl.
CPC .......... *H04W 74/04* (2013.01); *H04W 74/08* (2013.01); *H04W 76/15* (2018.02); *H04W 52/244* (2013.01); *H04W 52/34* (2013.01); *H04W 84/045* (2013.01)

(58) Field of Classification Search
USPC ........................................................ 370/329
See application file for complete search history.

(56) References Cited

U.S. PATENT DOCUMENTS

| | | | | |
|---|---|---|---|---|
| 10,588,154 | B2* | 3/2020 | Pelletier | H04W 56/0005 |
| 2004/0142692 | A1* | 7/2004 | Schwarz | H04W 52/40 |
| | | | | 455/442 |
| 2004/0252655 | A1* | 12/2004 | Lim | H04B 7/216 |
| | | | | 370/321 |
| 2010/0302934 | A1* | 12/2010 | Baker | H04W 74/08 |
| | | | | 370/217 |
| 2011/0026409 | A1* | 2/2011 | Hu | H04L 1/1867 |
| | | | | 370/243 |
| 2011/0051697 | A1* | 3/2011 | Wang | H04W 28/0236 |
| | | | | 370/336 |
| 2013/0188580 | A1 | 7/2013 | Dinan | |
| 2013/0242730 | A1 | 9/2013 | Pelletier et al. | |
| 2013/0279433 | A1 | 10/2013 | Dinan | |
| 2014/0161089 | A1 | 6/2014 | Ahn et al. | |
| 2015/0223181 | A1* | 8/2015 | Noh | H04L 25/0226 |
| | | | | 370/329 |
| 2016/0255658 | A1 | 9/2016 | Fujishiro et al. | |
| 2016/0302235 | A1 | 10/2016 | Hwang et al. | |
| 2018/0035472 | A1 | 2/2018 | Hwang et al. | |
| 2018/0279383 | A1 | 9/2018 | Hwang et al. | |

FOREIGN PATENT DOCUMENTS

| | | |
|---|---|---|
| EP | 2667675 | 11/2013 |
| EP | 2728771 | 5/2014 |
| JP | 2006333404 | 12/2006 |
| JP | 2011250471 | 12/2011 |
| JP | 2013197876 | 9/2013 |
| KR | 10-2012-0081558 A | 7/2012 |
| KR | 1020120114171 | 10/2012 |
| KR | 10-2013-0010870 A | 1/2013 |
| KR | 10-2013-0024895 | 3/2013 |
| KR | 10-2013-0090804 A | 8/2013 |
| RU | 2451423 | 5/2012 |
| WO | 2010137917 | 12/2010 |
| WO | 2011120716 | 10/2011 |
| WO | 2012-148239 A2 | 11/2012 |
| WO | 2012148239 | 11/2012 |
| WO | 2012148239 A2 | 11/2012 |
| WO | 2012154955 | 11/2012 |
| WO | 2013-025009 A2 | 2/2013 |
| WO | 2013042908 | 3/2013 |
| WO | 2013044806 | 4/2013 |

OTHER PUBLICATIONS

European Patent Office Application Serial No. 19201733.3, Search Report dated Dec. 9, 2019, 5 pages.
State Intellectual Property Office of the People's Republic of China Application Serial No. 201480063359.1, Office Action dated Mar. 28, 2018, 8 pages.
Russian Federation Federal Service for Intellectual Property, Patents and Trademarks Application Serial No. 2016124116/07, Office Action dated Mar. 13, 2017, 7 pages.
European Patent Office Application Serial No. 14864323.2, Search Report dated Jun. 14, 2017, 98pages.
Intellectual Property Office of India Application Serial No. 201637016287, Office Action dated Nov. 13, 2019, 12 pages.

* cited by examiner (b) MULTIPLE CCS (a) SINGLE CC

METHOD FOR PERFORMING RANDOM ACCESS PROCEDURE

CROSS-REFERENCE TO RELATED APPLICATIONS

This application is a continuation of U.S. patent application Ser. No. 15/995,757, filed on Jun. 1, 2018, now U.S. Pat. No. 10,327,266, which is a continuation of U.S. patent application Ser. No. 15/782,323, filed on Oct. 12, 2017, now U.S. Pat. No. 10,009,932, which is a continuation of U.S. patent application Ser. No. 15/037,657, filed on May 18, 2016, now U.S. Pat. No. 9,826,554, which is the National Stage filing under 35 U.S.C. 371 of International Application No. PCT/KR2014/009723, filed on Oct. 16, 2014, which claims the benefit of U.S. Provisional Application Nos. 61/906,398, filed on Nov. 19, 2013, 61/932,208, filed on Jan. 27, 2014 and 62/060,540, filed on Oct. 6, 2014, the contents of which are all hereby incorporated by reference herein in their entirety.

BACKGROUND OF THE INVENTION

Field of the invention

The present invention relates to mobile communication.

Related Art $3^{rd}$ generation partnership project (3GPP) long term evolution (LTE) evolved from a universal mobile telecommunications system (UMTS) is introduced as the 3GPP release 8. The 3GPP LTE uses orthogonal frequency division multiple access (OFDMA) in a downlink, and uses single carrier-frequency division multiple access (SC-FDMA) in an uplink.

Such LTE may be divided into a frequency division duplex (FDD) type and a time division duplex (TDD) type.

As set forth in 3GPP TS 36.211 V10.4.0, the physical channels in 3GPP LTE may be classified into data channels such as PDSCH (physical downlink shared channel) and PUSCH (physical uplink shared channel) and control channels such as PDCCH (physical downlink control channel), PCFICH (physical control format indicator channel), PHICH (physical hybrid-ARQ indicator channel) and PUCCH (physical uplink control channel).

Meanwhile, in order to process a growing number of data, in a next-generation mobile communication system, a small cell having a small cell coverage radius is anticipated to be added to coverage of an existing cell and process more traffic.

Here, however, as a small cell is introduced, a terminal may need to perform a random access procedure in both of a macro cell and a small cell, but it is not permitted according to the current 3GPP standard specification.

SUMMARY OF THE INVENTION

Accordingly, a disclosure of the present specification has been made in an effort to solve the aforementioned problem.

In order to achieve the aforementioned purpose, one disclosure of the present specification provides a method for performing a random access procedure. The method may comprise: generating a random access preamble toward a first cell; generating a random access preamble toward a second cell; determining whether both the random access preamble toward the first cell and the random access preamble toward the second cell are triggered to be simultaneously transmitted on a same subframe; and selecting one random access preamble from the random access preambles toward the first and second cells according to a predefined order of priority if the random access preambles toward the first and second cells are triggered to be simultaneously transmitted; and transmitting the selected one random access preamble.

The first cell may be a macro cell and the second sell may be a small cell.

The predetermined order of the priority may be order of a primary cell and secondary cells having lower index.

The predetermined order of the priority may be order of a master cell group including a primary cell and a secondary cell group including a secondary cell.

The predetermined order of the priority may be order of a non-contention based random access procedure and a contention based random access procedure.

The predetermined order of the priority may be order of better channel qualities according to results of measurements.

The order of the priority may be predetermined according to root indexes for generating the random access preambles and a configuration of a physical random access channel (PRACH).

The method may further comprise: delaying a timing for transmitting an unselected random access preamble.

The method may further comprise: dropping a transmission of an unselected random access preamble at a corresponding transmission timing The method may further comprise: not incrementing a retransmission counter if the transmission of the unselected random access preamble is dropped at a corresponding transmission timing and is to be retransmitted.

In order to achieve the aforementioned purpose, one disclosure of the present specification provides a user equipment (UE). The UE may comprise: a processor configured to: generate a random access preamble toward a first cell, generate a random access preamble toward a second cell, determine whether both the random access preamble toward the first cell and the random access preamble toward the second cell are triggered to be simultaneously transmitted on a same subframe, and select one random access preamble from the random access preambles toward the first and second cells according to a predefined order of priority if the random access preambles toward the first and second cells are triggered to be simultaneously transmitted. The UE may comprise: a transceiver configured to transmit the one random access preamble selected by the processor.

According to a disclosure of the present invention, the above problem of the related art is solved.

DESCRIPTION OF EXEMPLARY EMBODIMENTS

Figure 1:
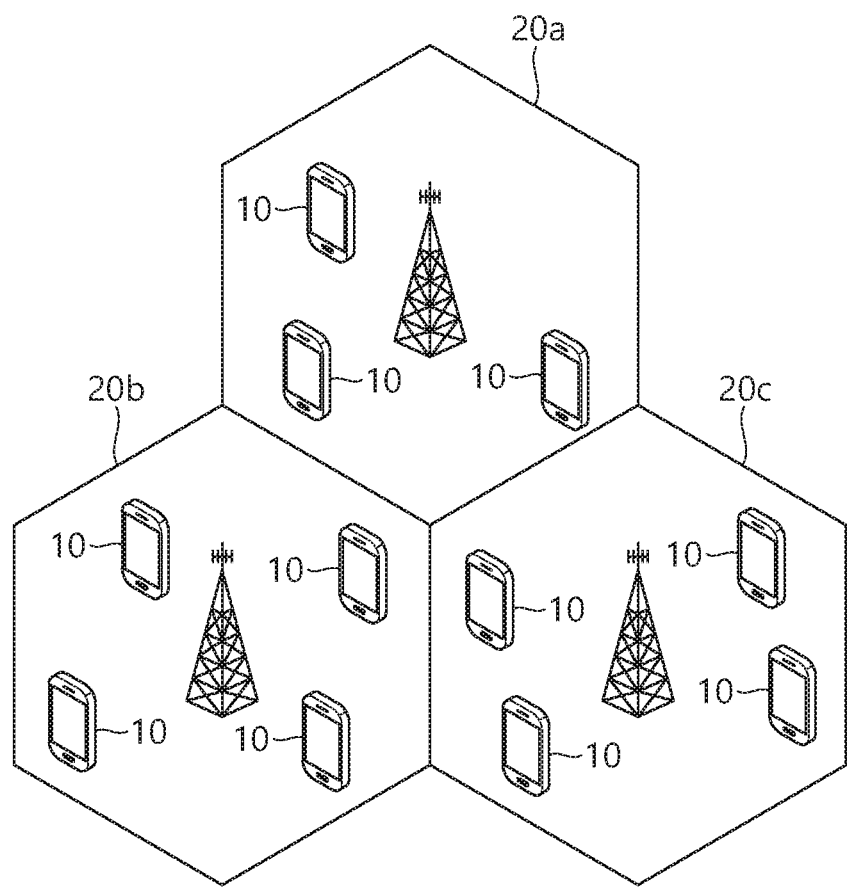
FIG. 1 illustrates a wireless communication system.

Hereinafter, based on 3rd Generation Partnership Project (3GPP) long term evolution (LTE) or 3GPP LTE-advanced (LTE-A), the present invention will be applied. This is just an example, and the present invention may be applied to various wireless communication systems. Hereinafter, LTE includes LTE and/or LTE-A.

The technical terms used herein are used to merely describe specific embodiments and should not be construed as limiting the present invention. Further, the technical terms used herein should be, unless defined otherwise, interpreted as having meanings generally understood by those skilled in the art but not too broadly or too narrowly. Further, the technical terms used herein, which are determined not to exactly represent the spirit of the invention, should be replaced by or understood by such technical terms as being able to be exactly understood by those skilled in the art. Further, the general terms used herein should be interpreted in the context as defined in the dictionary, but not in an excessively narrowed manner.

The expression of the singular number in the specification includes the meaning of the plural number unless the meaning of the singular number is definitely different from that of the plural number in the context. In the following description, the term 'include' or 'have' may represent the existence of a feature, a number, a step, an operation, a component, a part or the combination thereof described in the specification, and may not exclude the existence or addition of another feature, another number, another step, another operation, another component, another part or the combination thereof.

The terms 'first' and 'second' are used for the purpose of explanation about various components, and the components are not limited to the terms 'first' and 'second'. The terms 'first' and 'second' are only used to distinguish one component from another component. For example, a first component may be named as a second component without deviating from the scope of the present invention.

It will be understood that when an element or layer is referred to as being "connected to" or "coupled to" another element or layer, it can be directly connected or coupled to the other element or layer or intervening elements or layers may be present. In contrast, when an element is referred to as being "directly connected to" or "directly coupled to" another element or layer, there are no intervening elements or layers present.

Hereinafter, exemplary embodiments of the present invention will be described in greater detail with reference to the accompanying drawings. In describing the present invention, for ease of understanding, the same reference numerals are used to denote the same components throughout the drawings, and repetitive description on the same components will be omitted. Detailed description on well-known arts which are determined to make the gist of the invention unclear will be omitted. The accompanying drawings are provided to merely make the spirit of the invention readily understood, but not should be intended to be limiting of the invention. It should be understood that the spirit of the invention may be expanded to its modifications, replacements or equivalents in addition to what is shown in the drawings.

As used herein, 'base station' generally refers to a fixed station that communicates with a wireless device and may be denoted by other terms such as eNB (evolved-NodeB), BTS (base transceiver system), or access point.

As used herein, user equipment (UE) may be stationary or mobile, and may be denoted by other terms such as device, wireless device, terminal, MS(mobile station), UT(user terminal), SS(subscriber station), MT(mobile terminal) and etc.

FIG. 1 shows a wireless communication system.

Referring to FIG. 1, the wireless communication system includes at least one base station (BS) 20. Respective BSs 20 provide a communication service to particular geographical areas 20a, 20b, and 20c (which are generally called cells). The UE generally belongs to one cell and the cell to which the terminal belong is referred to as a serving cell. A base station that provides the communication service to the serving cell is referred to as a serving BS. Since the wireless communication system is a cellular system, another cell that neighbors to the serving cell is present. Another cell which neighbors to the serving cell is referred to a neighbor cell. A base station that provides the communication service to the neighbor cell is referred to as a neighbor BS. The serving cell and the neighbor cell are relatively decided based on the UE.

Hereinafter, a downlink means communication from the base station 20 to the terminal 10 and an uplink means communication from the terminal 10 to the base station 20. In the downlink, a transmitter may be a part of the base station 20 and a receiver may be a part of the terminal 10. In the uplink, the transmitter may be a part of the terminal 10 and the receiver may be a part of the base station 20.

Meanwhile, the wireless communication system may be any one of a multiple-input multiple-output (MIMO) system, a multiple-input single-output (MISO) system, a single-input single-output (SISO) system, and a single-input multiple-output (SIMO) system. The MIMO system uses a plurality of transmit antennas and a plurality of receive antennas. The MISO system uses a plurality of transmit antennas and one receive antenna. The SISO system uses one transmit antenna and one receive antenna. The SIMO system uses one transmit antenna and one receive antenna. Hereinafter, the transmit antenna means a physical or logical antenna used to transmit one signal or stream and the receive antenna means a physical or logical antenna used to receive one signal or stream.

Meanwhile, the wireless communication system may be generally divided into a frequency division duplex (FDD) type and a time division duplex (TDD) type. According to the FDD type, uplink transmission and downlink transmission are achieved while occupying different frequency bands. According to the TDD type, the uplink transmission and the downlink transmission are achieved at different time while occupying the same frequency band. A channel response of the TDD type is substantially reciprocal. This means that a downlink channel response and an uplink channel response are approximately the same as each other in a given frequency area. Accordingly, in the TDD based wireless communication system, the downlink channel response may be acquired from the uplink channel response. In the TDD type, since an entire frequency band is time-divided in the uplink transmission and the downlink transmission, the downlink transmission by the base station and the uplink transmission by the terminal may not be performed simultaneously. In the TDD system in which the uplink transmission and the downlink transmission are divided by the unit of a subframe, the uplink transmission and the downlink transmission are performed in different subframes.

Hereinafter, the LTE system will be described in detail.

Figure 2:
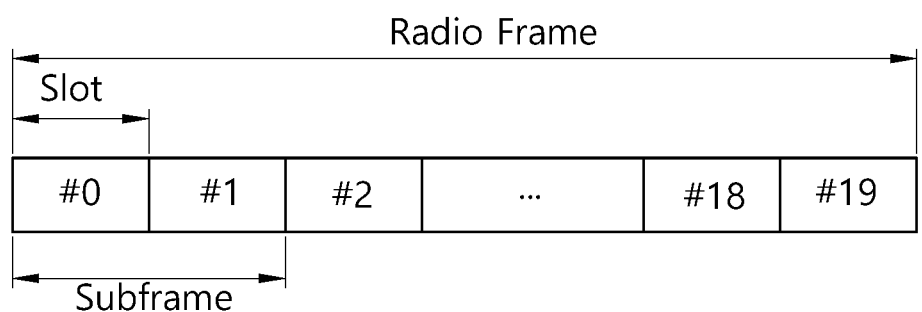
FIG. 2 illustrates the architecture of a radio frame according to frequency division duplex (FDD) of 3rd generation partnership project (3GPP) long term evolution (LTE).

FIG. 2 shows a downlink radio frame structure according to FDD of 3rd generation partnership project (3GPP) long term evolution (LTE).

The radio frame of FIG. 2 may be found in the section 5 of 3GPP TS 36.211 V10.4.0 (2011-12) "Evolved Universal Terrestrial Radio Access (E-UTRA); Physical Channels and Modulation (Release 10)".

Referring to FIG. 2, the radio frame consists of 10 subframes. One subframe consists of two slots. Slots included in the radio frame are numbered with slot numbers 0 to 19. A time required to transmit one subframe is defined as a transmission time interval (TTI). The TTI may be a scheduling unit for data transmission. For example, one radio frame may have a length of 10 milliseconds (ms), one subframe may have a length of 1 ms, and one slot may have a length of 0.5 ms.

The structure of the radio frame is for exemplary purposes only, and thus the number of subframes included in the radio frame or the number of slots included in the subframe may change variously.

Meanwhile, one slot may include a plurality of OFDM symbols. The number of OFDM symbols included in one slot may vary depending on a cyclic prefix (CP).

Figure 3:
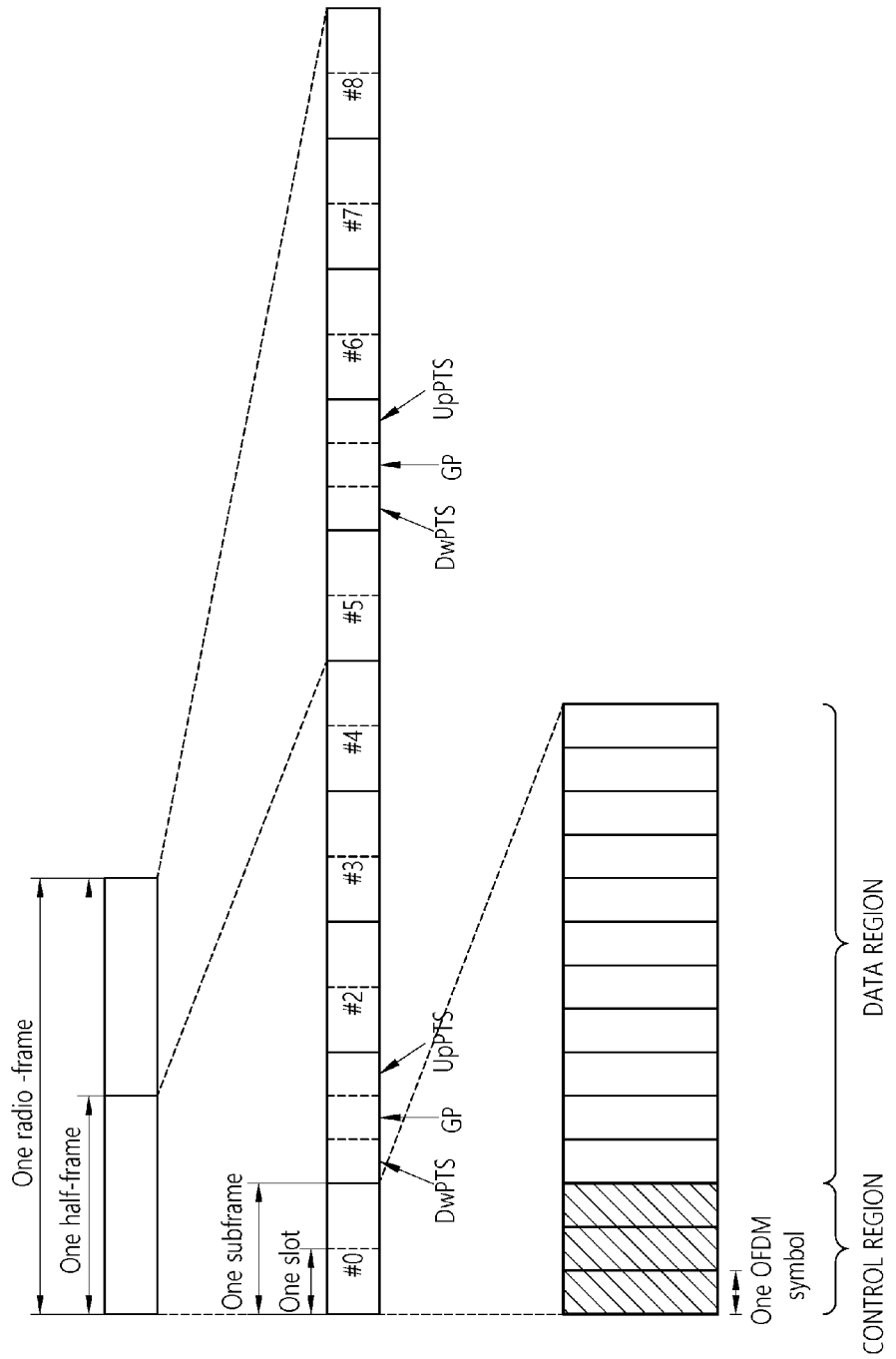
FIG. 3 illustrates the architecture of a downlink radio frame according to time division duplex (TDD) in 3GPP LTE.

FIG. 3 shows an example of a resource grid for one uplink or downlink slot in 3GPP LTE.

For this, 3GPP TS 36.211 V10.4.0 (2011-12) "Evolved Universal Terrestrial Radio Access (E-UTRA); Physical Channels and Modulation (Release 8)", Ch. 4 may be referenced, and this is for TDD (time division duplex).

The radio frame includes 10 sub-frames indexed 0 to 9. One sub-frame includes two consecutive slots. The time for one sub-frame to be transmitted is denoted TTI (transmission time interval). For example, the length of one sub-frame may be 1 ms, and the length of one slot may be 0.5 ms.

One slot may include a plurality of OFDM (orthogonal frequency division multiplexing) symbols in the time domain. The OFDM symbol is merely to represent one symbol period in the time domain since 3GPP LTE adopts OFDMA (orthogonal frequency division multiple access) for downlink (DL), and thus, the multiple access scheme or name is not limited thereto. For example, OFDM symbol may be denoted by other terms such as SC-FDMA (single carrier-frequency division multiple access) symbol or symbol period.

By way of example, one slot includes seven OFDM symbols. However, the number of OFDM symbols included in one slot may vary depending on the length of CP (cyclic prefix). According to 3GPP TS 36.211 V8.7.0, one slot, in the normal CP, includes seven OFDM symbols, and in the extended CP, includes six OFDM symbols.

Resource block (RB) is a resource allocation unit and includes a plurality of sub-carriers in one slot. For example, if one slot includes seven OFDM symbols in the time domain and the resource block includes 12 sub-carriers in the frequency domain, one resource block may include 7×12 resource elements (REs).

Sub-frames having index #1 and index #6 are denoted special sub-frames, and include a DwPTS (Downlink Pilot Time Slot: DwPTS), a GP (Guard Period) and an UpPTS (Uplink Pilot Time Slot). The DwPTS is used for initial cell search, synchronization, or channel estimation in a terminal. The UpPTS is used for channel estimation in the base station and for establishing uplink transmission sync of the terminal. The GP is a period for removing interference that arises on uplink due to a multi-path delay of a downlink signal between uplink and downlink.

In TDD, a DL (downlink) sub-frame and a UL (Uplink) co-exist in one radio frame. Table 1 shows an example of configuration of a radio frame.

TABLE 1

| UL-DL Config-uraiton | Switch-point periodicity | Subframe index | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

'D' denotes a DL sub-frame, 'U' a UL sub-frame, and 'S' a special sub-frame. When receiving a UL-DL configuration from the base station, the terminal may be aware of whether a sub-frame is a DL sub-frame or a UL sub-frame according to the configuration of the radio frame.

The DL (downlink) sub-frame is split into a control region and a data region in the time domain. The control region includes up to three first OFDM symbols in the first slot of the sub-frame. However, the number of OFDM symbols included in the control region may be changed. A PDCCH and other control channels are assigned to the control region, and a PDSCH is assigned to the data region.

Figure 4:
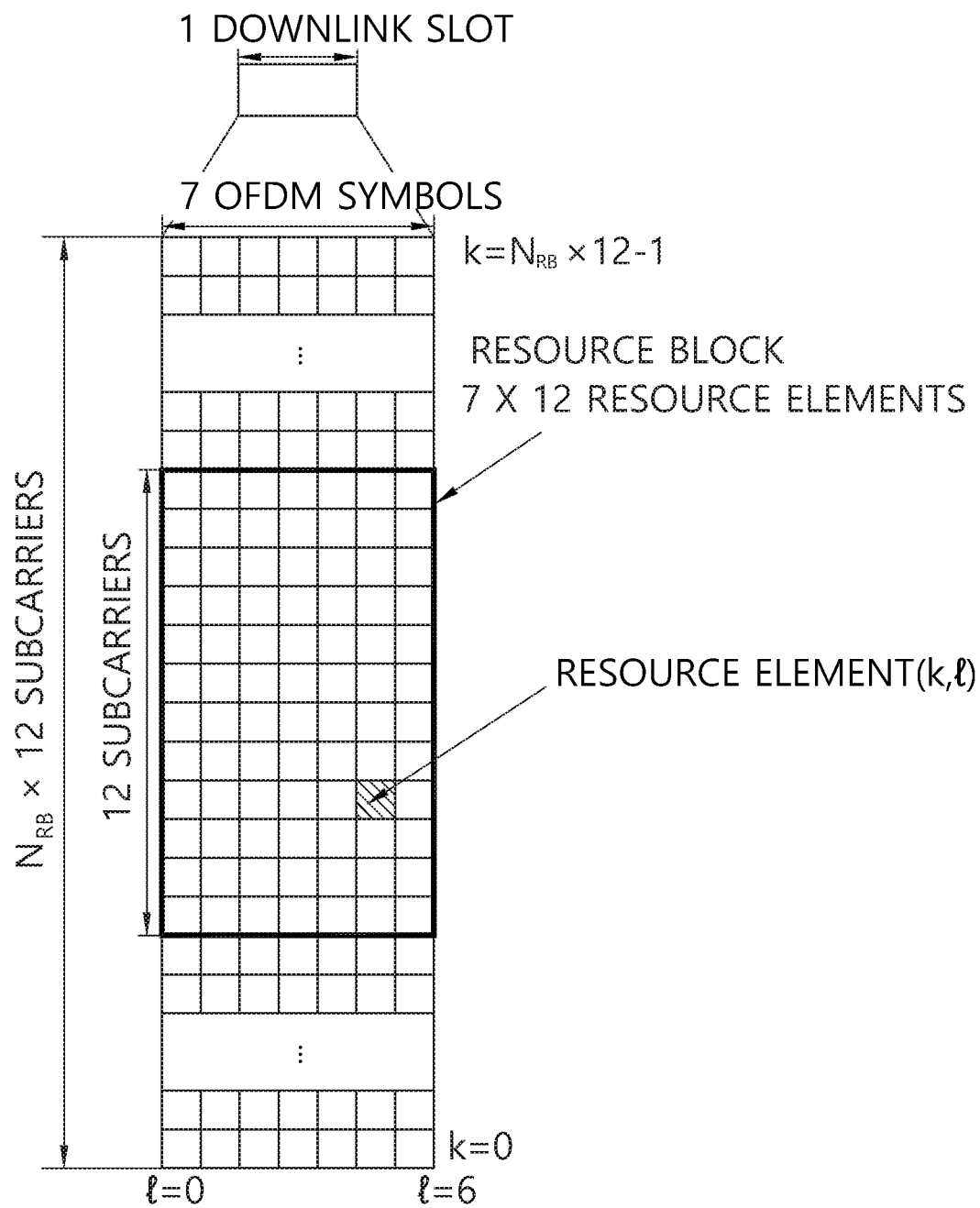
FIG. 4 illustrates an example resource grid for one uplink or downlink slot in 3GPP LTE.

FIG. 4 illustrates an example resource grid for one uplink or downlink slot in 3GPP LTE.

Referring to FIG. 4, the uplink slot includes a plurality of OFDM (orthogonal frequency division multiplexing) symbols in the time domain and $N_{RB}$ resource blocks ($RB_S$) in the frequency domain. For example, in the LTE system, the number of resource blocks ($RB_S$), i.e., $N_{RB}$, may be one from 6 to 110.

Here, by way of example, one resource block includes 7×12 resource elements that consist of seven OFDM symbols in the time domain and 12 sub-carriers in the frequency domain. However, the number of sub-carriers in the resource block and the number of OFDM symbols are not limited thereto. The number of OFDM symbols in the resource block or the number of sub-carriers may be changed variously. In other words, the number of OFDM symbols may be varied depending on the above-described length of CP. In particular, 3GPP LTE defines one slot as having seven OFDM symbols in the case of CP and six OFDM symbols in the case of extended CP.

OFDM symbol is to represent one symbol period, and depending on system, may also be denoted SC-FDMA symbol, OFDM symbol, or symbol period. The resource block is a unit of resource allocation and includes a plurality of sub-carriers in the frequency domain. The number of resource blocks included in the uplink slot, i.e., $N_{UL}$, is dependent upon an uplink transmission bandwidth set in a cell. Each element on the resource grid is denoted resource element.

Meanwhile, the number of sub-carriers in one OFDM symbol may be one of 128, 256, 512, 1024, 1536, and 2048.

In 3GPP LTE, the resource grid for one uplink slot shown in FIG. 4 may also apply to the resource grid for the downlink slot.

Figure 5:
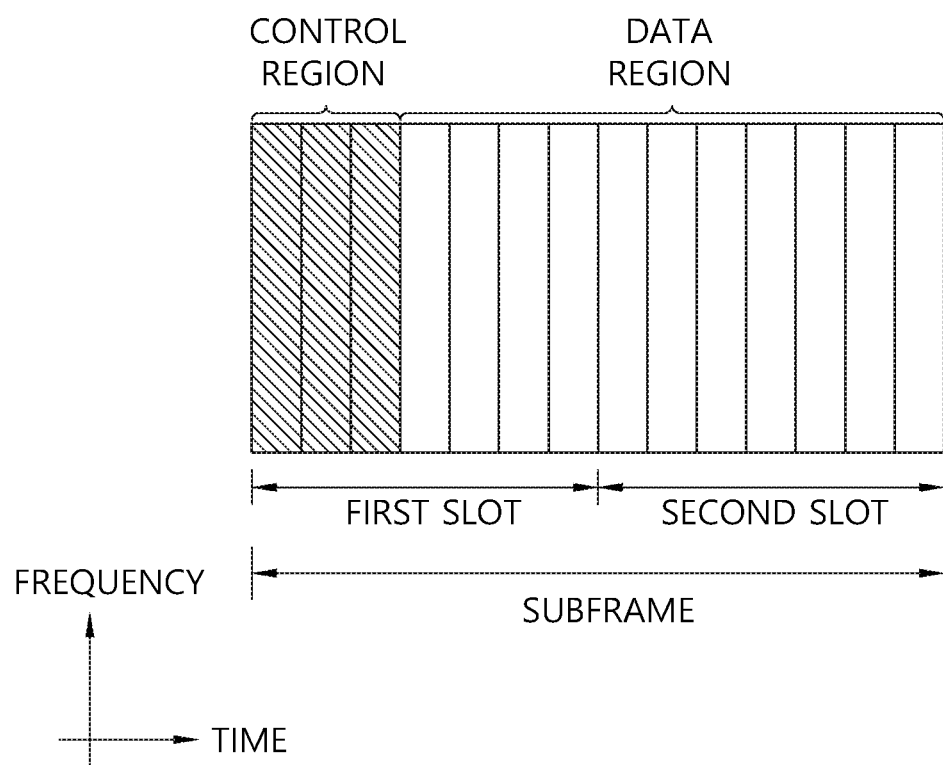
FIG. 5 illustrates the architecture of a downlink subframe.

FIG. 5 illustrates the architecture of a downlink sub-frame.

In FIG. 5, assuming the normal CP, one slot includes seven OFDM symbols, by way of example. However, the number of OFDM symbols included in one slot may vary depending on the length of CP (cyclic prefix). That is, as described above, according to 3GPP TS 36.211 V10.4.0, one slot includes seven OFDM symbols in the normal CP and six OFDM symbols in the extended CP.

Resource block (RB) is a unit for resource allocation and includes a plurality of sub-carriers in one slot. For example, if one slot includes seven OFDM symbols in the time domain and the resource block includes 12 sub-carriers in the frequency domain, one resource block may include 7×12 resource elements (REs).

The DL (downlink) sub-frame is split into a control region and a data region in the time domain. The control region includes up to first three OFDM symbols in the first slot of the sub-frame. However, the number of OFDM symbols included in the control region may be changed. A PDCCH (physical downlink control channel) and other control channels are assigned to the control region, and a PDSCH is assigned to the data region.

The physical channels in 3GPP LTE may be classified into data channels such as PDSCH (physical downlink shared channel) and PUSCH (physical uplink shared channel) and control channels such as PDCCH (physical downlink control channel), PCFICH (physical control format indicator channel), PHICH (physical hybrid-ARQ indicator channel) and PUCCH (physical uplink control channel).

The PCFICH transmitted in the first OFDM symbol of the sub-frame carries CIF (control format indicator) regarding the number (i.e., size of the control region) of OFDM symbols used for transmission of control channels in the sub-frame. The wireless device first receives the CIF on the PCFICH and then monitors the PDCCH.

Unlike the PDCCH, the PCFICH is transmitted through a fixed PCFICH resource in the sub-frame without using blind decoding.

The PHICH carries an ACK (positive-acknowledgement)/NACK (negative-acknowledgement) signal for a UL HARQ (hybrid automatic repeat request). The ACK/NACK signal for UL (uplink) data on the PUSCH transmitted by the wireless device is sent on the PHICH.

The PBCH (physical broadcast channel) is transmitted in the first four OFDM symbols in the second slot of the first sub-frame of the radio frame. The PBCH carries system information necessary for the wireless device to communicate with the base station, and the system information transmitted through the PBCH is denoted MIB (master information block). In comparison, system information transmitted on the PDSCH indicated by the PDCCH is denoted SIB (system information block).

The PDCCH may carry activation of VoIP (voice over internet protocol) and a set of transmission power control commands for individual UEs in some UE group, resource allocation of an higher layer control message such as a random access response transmitted on the PDSCH, system information on DL-SCH, paging information on PCH, resource allocation information of UL-SCH (uplink shared channel), and resource allocation and transmission format of DL-SCH (downlink-shared channel). A plurality of PDCCHs may be sent in the control region, and the terminal may monitor the plurality of PDCCHs. The PDCCH is transmitted on one CCE (control channel element) or aggregation of some consecutive CCEs. The CCE is a logical allocation unit used for providing a coding rate per radio channel's state to the PDCCH. The CCE corresponds to a plurality of resource element groups. Depending on the relationship between the number of CCEs and coding rates provided by the CCEs, the format of the PDCCH and the possible number of PDCCHs are determined.

The control information transmitted through the PDCCH is denoted downlink control information (DCI). The DCI may include resource allocation of PDSCH (this is also referred to as DL (downlink) grant), resource allocation of PUSCH (this is also referred to as UL (uplink) grant), a set of transmission power control commands for individual UEs in some UE group, and/or activation of VoIP (Voice over Internet Protocol).

The base station determines a PDCCH format according to the DCI to be sent to the terminal and adds a CRC (cyclic redundancy check) to control information. The CRC is masked with a unique identifier (RNTI; radio network temporary identifier) depending on the owner or purpose of the PDCCH. In case the PDCCH is for a specific terminal, the terminal's unique identifier, such as C-RNTI (cell-RNTI), may be masked to the CRC. Or, if the PDCCH is for a paging message, a paging indicator, for example, P-RNTI (paging-RNTI) may be masked to the CRC. If the PDCCH is for a system information block (SIB), a system information identifier, SI-RNTI (system information-RNTI), may be masked to the CRC. In order to indicate a random access response that is a response to the terminal's transmission of a random access preamble, an RA-RNTI (random access-RNTI) may be masked to the CRC.

In 3GPP LTE, blind decoding is used for detecting a PDCCH. The blind decoding is a scheme of identifying whether a PDCCH is its own control channel by demasking a desired identifier to the CRC (cyclic redundancy check) of a received PDCCH (this is referred to as candidate PDCCH) and checking a CRC error. The base station determines a PDCCH format according to the DCI to be sent to the wireless device, then adds a CRC to the DCI, and masks a unique identifier (this is referred to as RNTI (radio network temporary identifier) to the CRC depending on the owner or purpose of the PDCCH.

A control region in a subframe includes a plurality of control channel elements (CCEs). The CCE is a logical allocation unit used to provide the PDCCH with a coding rate depending on a radio channel state, and corresponds to a plurality of resource element groups (REGs). The REG includes a plurality of resource elements. According to an association relation of the number of CCEs and the coding rate provided by the CCEs, a PDCCH format and the number of bits of an available PDCCH are determined.

One REG includes 4 REs. One CCE includes 9 REGs. The number of CCEs used to configure one PDCCH may be selected from a set {1, 2, 4, 8}. Each element of the set {1, 2, 4, 8} is referred to as a CCE aggregation level.

The BS determines the number of CCEs used in transmission of the PDCCH according to a channel state. For example, a wireless device having a good DL channel state can use one CCE in PDCCH transmission. A wireless device having a poor DL channel state can use 8 CCEs in PDCCH transmission.

A control channel consisting of one or more CCEs performs interleaving on an REG basis, and is mapped to a physical resource after performing cyclic shift based on a cell identifier (ID).

Meanwhile, a UE is unable to know that the PDCCH of its own is transmitted on which position within control region and using which CCE aggregation level or DCI format. Since a plurality of PDCCHs may be transmitted in one subframe, the UE monitors a plurality of PDCCHs in every subframe. Here, the monitoring is referred to try to decode the PDCCH by the UE according to the PDCCH format.

In 3GPP LTE, in order to decrease the load owing to the blind decoding, a search space is used. The search space may be referred to a monitoring set of CCE for the PDCCH. The UE monitors the PDCCH within the corresponding search space.

When a UE monitors the PDCCH based on the C-RNTI, the DCI format and the search space which is to be monitored are determined according to the transmission mode of the PDSCH. The table below represents an example of the PDCCH monitoring in which the C-RNTI is setup.

TABLE 2

| Transmission mode | DCI format | Search space | Transmission mode of PDSCH according to PDCCH |
|---|---|---|---|
| Transmission mode 1 | DCI format 1A | Public service and terminal specific | Single antenna port, port 0 |
| | DCI format 1 | Terminal specific | Single antenna port, port 0 |
| Transmission mode 2 | DCI format 1A | Public service and terminal specific | Transmit diversity |
| | DCI format 1 | Terminal specific | Transmit diversity |
| Transmission mode 3 | DCI format 1A | Public service and terminal specific | Transmit diversity |
| | DCI format 2A | Terminal specific | CDD (Cyclic Delay Diversity) or transmit diversity |
| Transmission mode 4 | DCI format 1A | Public service and terminal specific | Transmit diversity |
| | DCI format 2 | Terminal specific | Closed-loop spatial multiplexing |
| Transmission mode 5 | DCI format 1A | Public service and terminal specific | Transmit diversity |
| | DCI format 1D | Terminal specific | MU-MIMO (Multi-user Multiple Input Multiple Output) |
| Transmission mode 6 | DCI format 1A | Public service and terminal specific | Transmit diversity |
| | DCI format 1B | Terminal specific | Closed-loop spatial multiplexing |
| Transmission mode 7 | DCI format 1A | Public service and terminal specific | If the number of PBCH transmisison ports is 1, single antenna port, port 0. Otherwise, transmit diversity |
| | DCI format 1 | Terminal specific | Single antenna port, port 5 |
| Transmission mode 8 | DCI format 1A | Public service and terminal specific | If the number of PBCH transmisison ports is 1, single antenna port, port 0. Otherwise, transmit diversity |
| | DCI format 2B | Terminal specific | Dual layer transmisison (port 7 or 8), or single antenna port, port 7 or 8 |
| Transmission mode 9 | DCI format 1A | Public service and terminal specific | Non-MBSFN sub-frame: if the number of PBCH antenna ports is 1, port 0 is used as independent antenna port. Otherwise, transmit Diversity MBSFNs ub-frame: port 7 as independent antenna port |
| | DCI format 2C | Terminal specific | 8 transmisison layers, ports 7-14 are used or port 7 or 8 is used as independent antenna port |
| Transmission mode 10 | DCI 1A | Public service and terminal specific | Non-MBSFN sub-frame: if the number of PBCH antenna ports is 1, port 0 is used as independent antenna port. Otherwise, transmit Diversity MBSFN sub-frame: port 7 as independent antenna port |
| | DCI format 2D | Terminal specific | 8 transmisison layers, ports 7-14 are used or port 7 or 8 is used as independent antenna port |

The usage of the DCI format is classified as shown in Table 3 below.

TABLE 3

| DCI format | Contents |
| --- | --- |
| DCI format 0 | Used in PUSCH scheduling |
| DCI format 1 | Used in scheduling of one PDSCH codeword |
| DCI format 1A | Used in compact scheduling of one PDSCH codeword and random access process |
| DCI format 1B | Used in compact scheduling of one PDSCH codeword having precoding information |
| DCI format 1C | Used in very compact scheduling of one PDSCH codeword |
| DCI format 1D | Used in precoding and compact scheduling of one PDSCH codeword having power offset information |
| DCI format 2 | Used in PDSCH scheduling of terminals configured in closed-loop spatial multiplexing mode |
| DCI format 2A | Used in PDSCH scheduling of terminals configured in open-loop spatial multiplexing mode |
| DCI format 2B | DCI format 2B is used for resouce allocation for dual-layer beam-forming of PDSCH. |
| DCI format 2C | DCI format 2C is used for resouce allocation for closed-loop SU-MIMO or MU-MIMO operation to 8 layers. |
| DCI format 2D | DCI format 2C is used for resouce allocation to 8 layers. |
| DCI format 3 | Used to transmit TPC command of PUCCH and PUSCH having 2 bit power adjustments |
| DCI format 3A | Used to transmit TPC command of PUCCH and PUSCH having 1 bit power adjustment |
| DCI format 4 | Used in PUSCH scheduling of uplink (UP) operated in multi-antenna port transmisison mode |

The uplink channels include a PUSCH, a PUCCH, an SRS (Sounding Reference Signal), and a PRACH (physical random access channel).

Meanwhile, the PDCCH is monitored in an area restricted to the control region in the subframe, and a CRS transmitted in a full band is used to demodulate the PDCCH. As a type of control data is diversified and an amount of control data is increased, scheduling flexibility is decreased when using only the existing PDCCH. In addition, in order to decrease an overhead caused by CRS transmission, an enhanced PDCCH (EPDCCH) is introduced.

Figure 6:
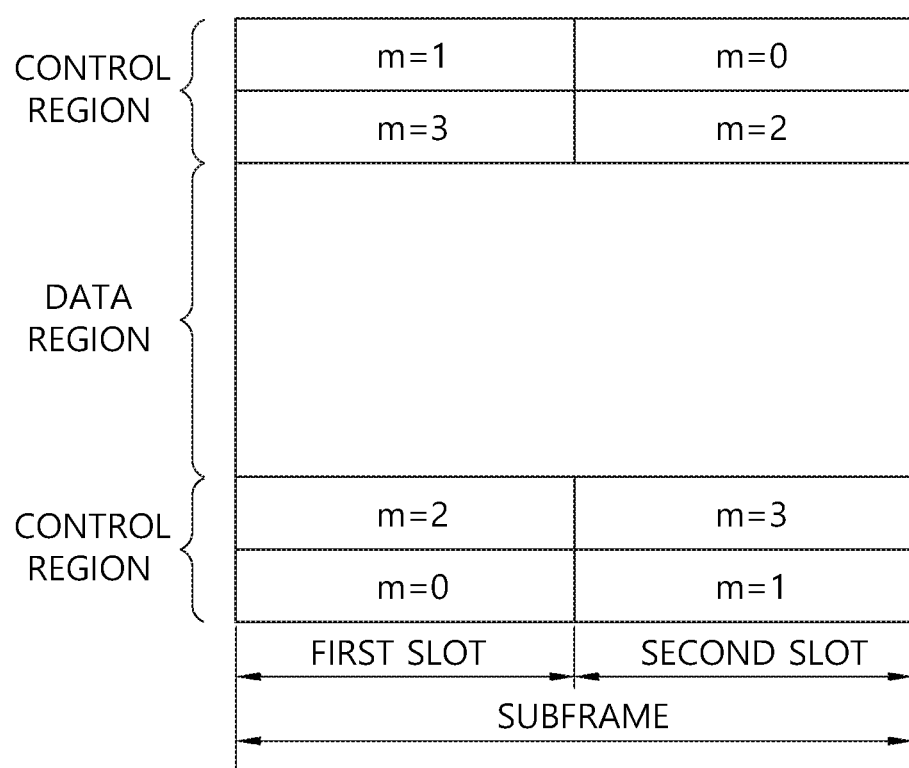
FIG. 6 illustrates the architecture of an uplink subframe in 3GPP LTE.

FIG. 6 shows a structure of an uplink subframe in 3GPP LTE.

Referring to FIG. 6, the uplink subframe can be divided into a control region and a data region. A physical uplink control channel (PUCCH) for carrying uplink control information is allocated to the control region. A physical uplink shared channel (PUSCH) for carrying data is allocated to the data region.

The PUCCH for one UE is allocated in an RB pair in a subframe. RBs belonging to the RB pair occupy different subcarriers in each of a first slot and a second slot. A frequency occupied by the RBs belonging to the RB pair to which the PUCCH is allocated changes at a slot boundary. This is called that the RB pair allocated to the PUCCH is frequency-hopped at the slot boundary.

Since the UE transmits the uplink control information on a time basis through different subcarriers, a frequency diversity gain can be obtained. m is a location index indicating a logical frequency domain location of a RB pair allocated to a PUCCH in a subframe.

Examples of the uplink control information transmitted on a PUCCH include hybrid automatic repeat request (HARQ), acknowledgement (ACK)/non-acknowledgement (NACK), channel quality indicator (CQI) indicating a DL channel state, scheduling request (SR) which is a UL radio resource allocation request, etc.

The PUSCH is mapped to an uplink shared channel (UL-SCH) which is a transport channel. Uplink data transmitted through the PUSCH may be a transport block which is a data block for the UL-SCH transmitted during a TTI. The transport block may be user information. In addition, the uplink data may be multiplexed data. The multiplexed data may be obtained by multiplexing the control information and a transport block for the UL-SCH.

A carrier aggregation system is now described.

Figure 7:
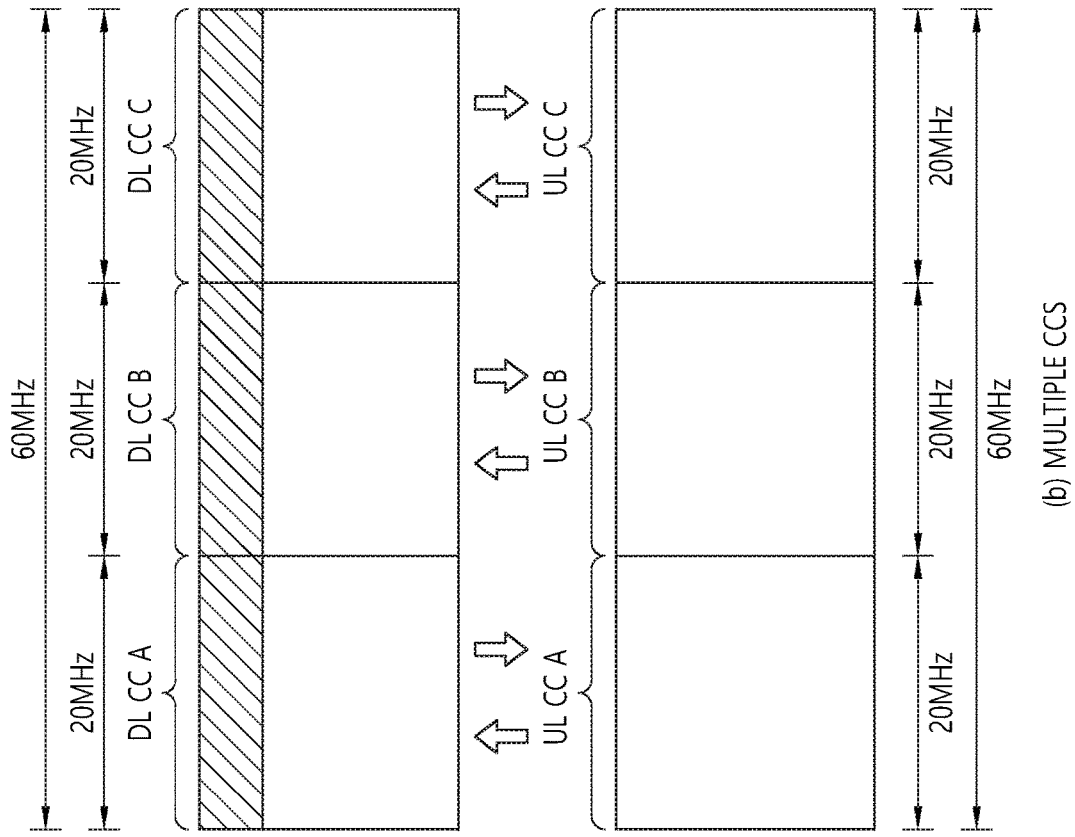
FIG. 7 illustrates an example of comparison between a single carrier system and a carrier aggregation system.
Figure 7:
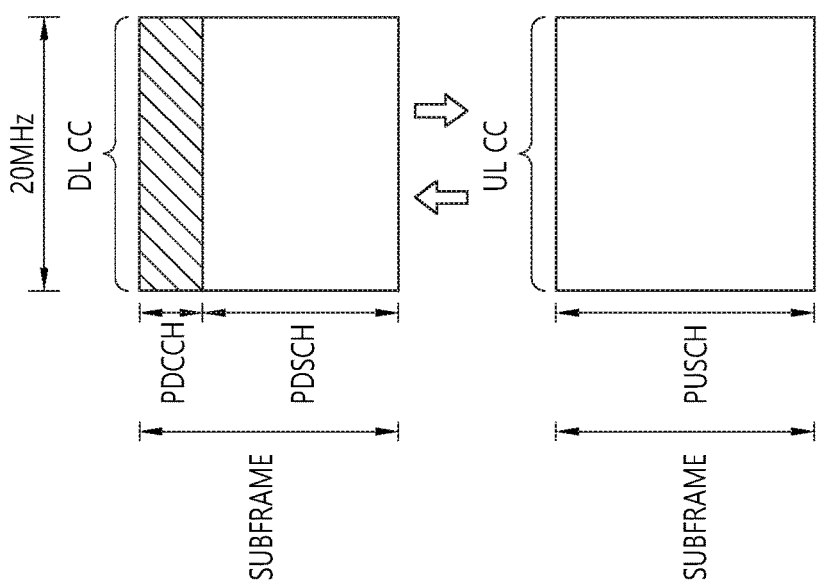

FIG. 7 illustrates an example of comparison between a single carrier system and a carrier aggregation system.

Referring to FIG. 7, there may be various carrier bandwidths, and one carrier is assigned to the terminal. On the contrary, in the carrier aggregation (CA) system, a plurality of component carriers (DL CC A to C, UL CC A to C) may be assigned to the terminal. Component carrier (CC) means the carrier used in then carrier aggregation system and may be briefly referred as carrier. For example, three 20 MHz component carriers may be assigned so as to allocate a 60 MHz bandwidth to the terminal.

Carrier aggregation systems may be classified into a contiguous carrier aggregation system in which aggregated carriers are contiguous and a non-contiguous carrier aggregation system in which aggregated carriers are spaced apart from each other. Hereinafter, when simply referring to a carrier aggregation system, it should be understood as including both the case where the component carrier is contiguous and the case where the control channel is non-contiguous.

When one or more component carriers are aggregated, the component carriers may use the bandwidth adopted in the existing system for backward compatibility with the existing system. For example, the 3GPP LTE system supports bandwidths of 1.4 MHz, 3 MHz, 5 MHz, 10 MHz, 15 MHz and 20 MHz, and the 3GPP LTE-A system may configure a broad band of 20 MHz or more only using the bandwidths of the 3GPP LTE system. Or, rather than using the bandwidths of the existing system, new bandwidths may be defined to configure a wide band.

The system frequency band of a wireless communication system is separated into a plurality of carrier frequencies. Here, the carrier frequency means the cell frequency of a cell. Hereinafter, the cell may mean a downlink frequency resource and an uplink frequency resource. Or, the cell may refer to a combination of a downlink frequency resource and an optional uplink frequency resource. Further, in the general case where carrier aggregation (CA) is not in consideration, one cell may always have a pair of an uplink frequency resource and a downlink frequency resource.

In order for packet data to be transmitted/received through a specific cell, the terminal should first complete a configuration on the specific cell. Here, the configuration means that reception of system information necessary for data transmission/reception on a cell is complete. For example, the configuration may include an overall process of receiving common physical layer parameters or MAC (media access control) layers necessary for data transmission and reception or parameters necessary for a specific operation in the RRC layer. A configuration-complete cell is in the state where, once when receiving information indicating packet data may be transmitted, packet transmission and reception may be immediately possible.

The cell that is in the configuration complete state may be left in an activation or deactivation state. Here, the "activation" means that data transmission or reception is being conducted or is in ready state. The terminal may monitor or receive a control channel (PDCCH) and a data channel (PDSCH) of the activated cell in order to identify resources (possibly frequency or time) assigned thereto.

The "deactivation" means that transmission or reception of traffic data is impossible while measurement or transmission/reception of minimal information is possible. The terminal may receive system information (SI) necessary for receiving packets from the deactivated cell. In contrast, the terminal does not monitor or receive a control channel (PDCCH) and data channel (PDSCH) of the deactivated cell in order to identify resources (probably frequency or time) assigned thereto.

Cells may be classified into primary cells and secondary cells, serving cells.

The primary cell means a cell operating at a primary frequency. The primary cell is a cell where the terminal conducts an initial connection establishment procedure or connection re-establishment procedure with the base station or is a cell designated as a primary cell during the course of handover.

The secondary cell means a cell operating at a secondary frequency. The secondary cell is configured once an RRC connection is established and is used to provide an additional radio resource.

The serving cell is configured as a primary cell in case no carrier aggregation is configured or when the terminal cannot offer carrier aggregation. In case carrier aggregation is configured, the term "serving cell" denotes a cell configured to the terminal and a plurality of serving cells may be included. One serving cell may consist of one downlink component carrier or a pair of {downlink component carrier, uplink component carrier}. A plurality of serving cells may consist of a primary cell and one or more of all the secondary cells.

As described above, the carrier aggregation system, unlike the single carrier system, may support a plurality of component carriers (CCs), i.e., a plurality of serving cells.

Such carrier aggregation system may support cross-carrier scheduling. The cross-carrier scheduling is a scheduling scheme that may conduct resource allocation of a PUSCH transmitted through other component carriers than the component carrier basically linked to a specific component carrier and/or resource allocation of a PDSCH transmitted through other component carriers through a PDCCH transmitted through the specific component carrier. In other words, the PDCCH and the PDSCH may be transmitted through different downlink CCs, and the PUSCH may be transmitted through an uplink CC other than the uplink CC linked to the downlink CC where the PDCCH including a UL grant is transmitted. As such, the system supporting cross-carrier scheduling needs a carrier indicator indicating a DL CC/UL CC through which a PDSCH/PUSCH is transmitted where the PDCCH offers control information. The field including such carrier indicator is hereinafter denoted carrier indication field (CIF).

The carrier aggregation system supporting cross-carrier scheduling may contain a carrier indication field (CIF) in the conventional DCI (downlink control information) format. In the cross-carrier scheduling-supportive carrier aggregation system, for example, an LTE-A system, may have 3 bits expanded due to addition of the CIF to the existing DCI format (i.e., the DCI format used in the LTE system), and the PDCCH architecture may reuse the existing coding method or resource allocation method (i.e., CCE-based resource mapping).

Figure 8:
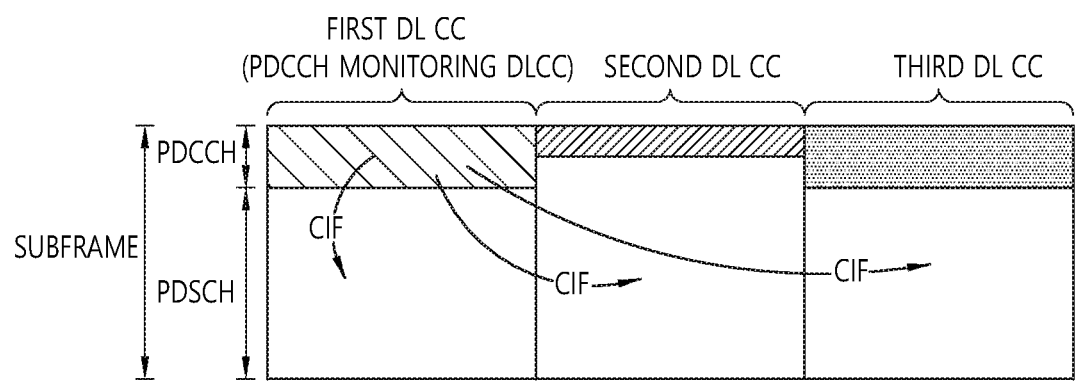
FIG. 8 exemplifies cross-carrier scheduling in a carrier aggregation system.

FIG. 8 exemplifies cross-carrier scheduling in the carrier aggregation system.

Referring to FIG. 8, the base station may configure a PDCCH monitoring DL CC (monitoring CC) set. The PDCCH monitoring DL CC set consists of some of all of the aggregated DL CCs, and if cross-carrier scheduling is configured, the user equipment performs PDCCH monitoring/decoding only on the DL CCs included in the PDCCH monitoring DL CC set. In other words, the base station transmits a PDCCH for PDSCH/PUSCH that is subject to scheduling only through the DL CCs included in the PDCCH monitoring DL CC set. The PDCCH monitoring DL CC set may be configured UE-specifically, UE group-specifically, or cell-specifically.

FIG. 8 illustrates an example in which three DL CCs (DL CC A, DL CC B, and DL CC C) are aggregated, and DL CC A is set as a PDCCH monitoring DL CC. The user equipment may receive a DL grant for the PDSCH of DL CC A, DL CC B, and DL CC C through the PDCCH of DL CC A. The DCI transmitted through the PDCCH of DL CC A contains a CIF so that it may indicate which DL CC the DCI is for.

Figure 9:
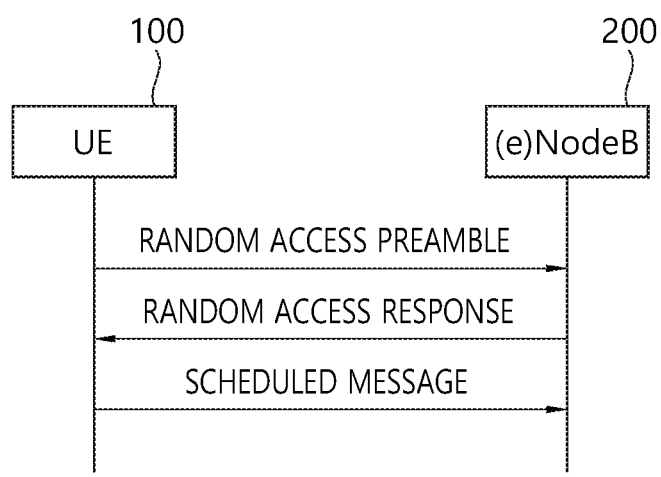
FIG. 9 is a flow chart illustrating a random access procedure in 3GPP LTE.

FIG. 9 is a flow chart illustrating a random access procedure in 3GPP LTE.

A random access procedure is used to enable a UE 100 to obtain UL synchronzation with a base station, that is, an eNodeB 200 or to be allocated UL radio resource.

The UE 100 receives a root index and a physical random access channel (PRACH) configuration index from the eNodeB 200. Each cell has 64 candidate random access preambles defined by a Zadoff-Chu (ZC) sequence, and the root index is a logical index for generating the 64 candidate random access preambles.

Transmission of the random access preambles are limited to specific time and frequency resource in each cell. The PRACH configuration index indicates a specific subframe in which a random access preamble can be transmitted and a preamble format.

The UE 100 transmits an arbitrarily selected random access preamble to the eNodeB 200. The UE 100 selects one of the 64 candidate random access preambles. The eNodeB 200 also selects a subframe corresponding to the PRACH configuration index. The UE 100 transmits the selected random access preamble in the selected subframe.

Upon receiving the random access preamble, the eNodeB 200 transmits a random access response (RAR) to the UE 100. The RAR is detected by two stages. First, the UE 100 detects a PDCCH masked with a random access (RA)-RNTI. The UE 100 receives an RAR of a medium access control (MAC) protocol data unit (PDU) on a PDSCH indicated by the detected PDCCH.

<Introduction of Small Cell>

Meanwhile, in the next-generation mobile communication system, it is anticipated that a small cell having a small cell coverage radius is added to coverage of an existing cell and processes more traffic. The existing cell has coverage greater than that of the small cell, and thus, it is also termed a macro cell. This will be described with reference to FIG. 10 hereinafter.

Figure 10:
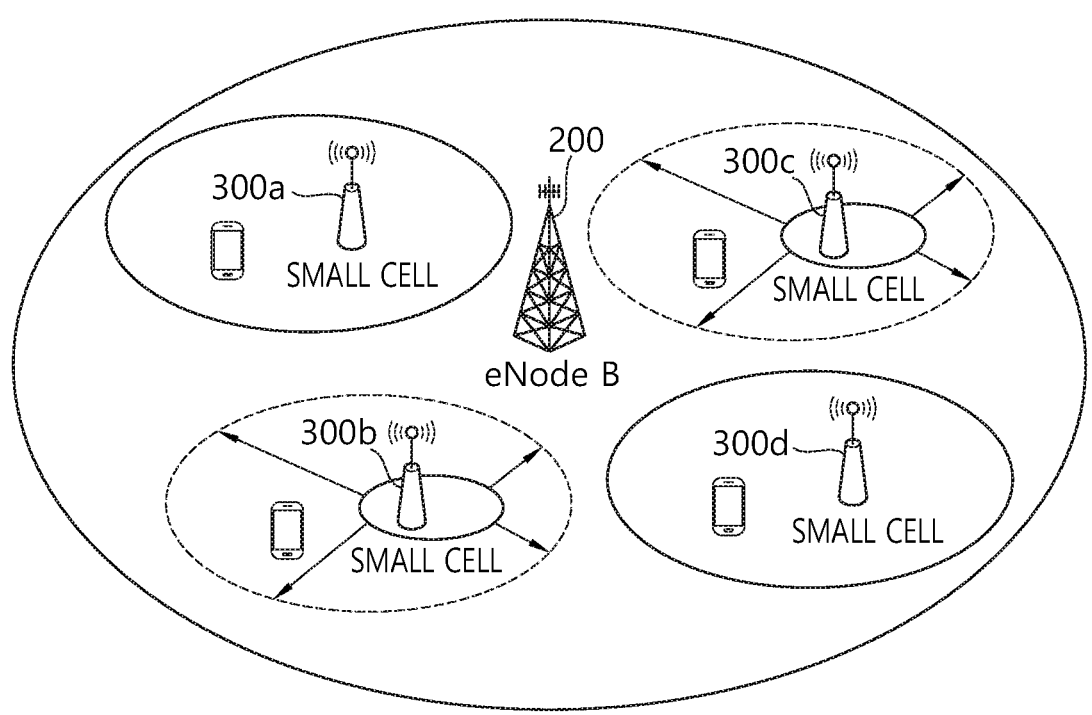
FIG. 10 is a view illustrating an environment of a heterogeneous network in which a macro cell and small cells coexist, which has a possibility of becoming a next-generation wireless communication system.

FIG. 10 is a view illustrating an environment of a heterogeneous network in which a macro cell and small cells coexist, which has a possibility of becoming a next-generation wireless communication system.

Referring to FIG. 10, a heterogeneous network environment in which a macro cell based on the existing eNodeB 200 overlaps small cells based on one or more small base stations (BSs) 300a, 300b, 300c, and 300d is illustrated. The existing eNodeB 200 provides large coverage, relative to the small BSs, and thus, it is also called a macro eNodeB (MeNB). In this disclosure, terms of macro cell and macro eNodeB will be used together. A UE connected to the macro cell 200 may be termed a macro UE. The macro UE receives a downlink signal from the macro eNodeB, and transmits an uplink signal to the macro eNodeB.

In the heterogeneous network, by setting the macro cell to a primary cell (Pcell) and the small cells to secondary cells (Scell), a gap of coverage of the macro cell may be filled. Also, by setting the small cells to primary cells (Pcell) and the macro cell to a secondary cell (Scell), overall performance may be boosted.

Meanwhile, the small cells may use a frequency band currently allocated based on LTE/LTE-A, or may use a higher frequency band (for example, a band of 3.5 GHz or higher).

On the other hand, the LTE-A system also considers to use a small cell only as a macro-assisted small cell that may be used with the help of a macro cell, rather than being used independently, in the future.

The small cells 300a, 300b, 300c, and 300d may have a similar channel environment, and since the small cells are positioned to be adjacent, interference therebetween may be problematic.

In order to reduce an interference influence, the small cells 300b and 300c may expand or reduce coverage thereof. The expansion and reduction in coverage is termed cell breathing. For example, as illustrated, the small cells 300b and 300c may be turned on or off according to situations.

On the other hand, the small cells may use a frequency band currently allocated based on LTE/LTE-A, or may use a higher frequency band (for example, a band of 3.5 GHz or higher).

Meanwhile, the UE may be dually connected to the macro cell and the small cell. Scenarios in which dual connectivity is available are illustrated in FIGS. 11A to 11D.

Figure 11A:
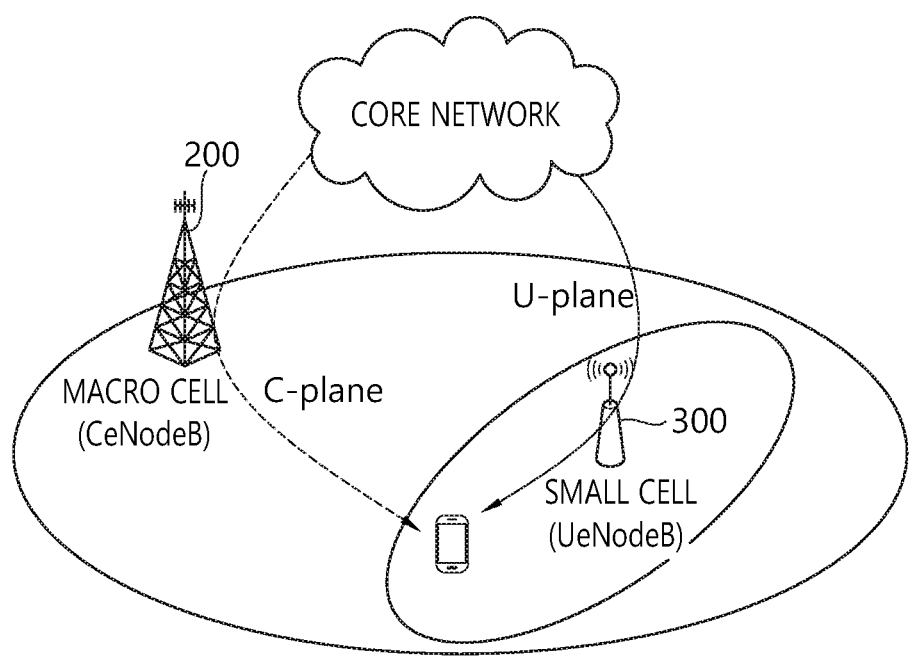
FIGS. 11A and 11B illustrate scenarios of dual-connectivity available for a macro cell and a small cell.
Figure 11B:
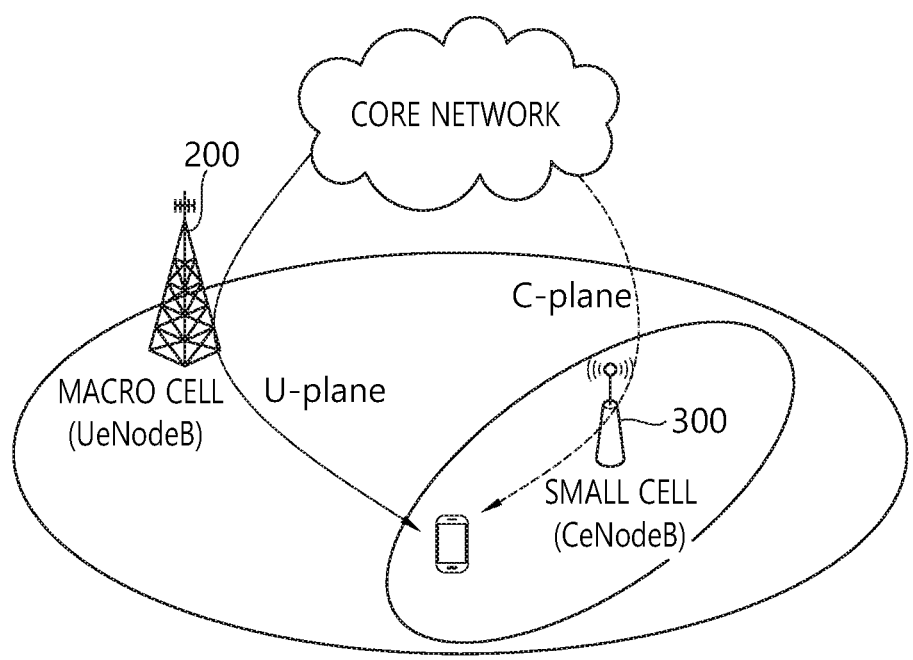

FIGS. 11A and 11B illustrate scenarios of dual-connectivity available for a macro cell and a small cell.

As illustrated in FIG. 11A, a UE may be set a macro cell on a control-plane (C-plane) and may be set a small cell on a user-plane (U-plane).

Alternatively, as illustrated in FIG. 11B, the UE may be set a small cell on the C-plane and may be set a macro cell on the U-plane. In this disclosure, for the purposes of description, a cell of the C-plane will be referred to as a "C-Cell" and a cell of the U-plane will be referred to as a "U-Cell".

Here, the aforementioned C-plane refers to supporting RRC connection configuration and re-configuration, an RRC idle mode, mobility including handover, cell selection, reselection, an HARQ process, configuration and reconfiguration of carrier aggregation (CA), a procedure required for RRC configuration, a random access procedure, and the like. The aforementioned U-plane refers to supporting processing of data of an application, CSI report, an HARQ process regarding application data, a multicasting/broadcasting service, and the like.

From the point of view of the UE, setting of the C-plane and the U-plane is as follows. The C-Cell is set to a primary cell, and the U-Cell may be set to a secondary cell. Or, conversely, the U-Cell may be set to a primary cell, and the C-Cell may be set to a secondary cell. Or, the C-Cell may be particularly processed separately, and the U-Cell may be set to a primary cell. Or, both the C-plane and the U-plane may be set to primary cells. Hereinafter, in this disclosure, for the purposes of description, it is assumed that the C-Cell is set to a primary cell and the U-Cell is set to a secondary cell.

Meanwhile, in a situation the UE 100 frequently moves in short distances, handover may occur excessively frequently. Thus, in order to prevent this, as illustrated in FIG. 12A, it may be advantageous for the UE to be set the macro cell as a C-cell or a primary cell and may be set the small cell as a U-cell or a secondary cell On this account, the macro cell may be constantly connected, as a primary cell, to the UE. In this case, since the macro cell is a primary cell, the UE may transmit a PUCCH to the macro cell.

Meanwhile, in order to process data traffic increased with the lapse of time, the small cells may be disposed more densely and a growing number of UEs may be connected to the small cells. Accordingly, compared with a case in which an existing macro cell accommodates UEs solely, a larger number of UEs may be served.

On the other hand, as a small cell is introduced, the UE 100 may need to transmit a PRACH (for example, a random access preamble) to both the macro cell and the small cell. However, the current 3GPP standard specifications specify that the UE should not simultaneously transmit a plurality of PRACHs. Hereinafter, a situation in which a plurality of PRACHs should be transmitted will be described with reference to FIG. 12.

Figure 12:
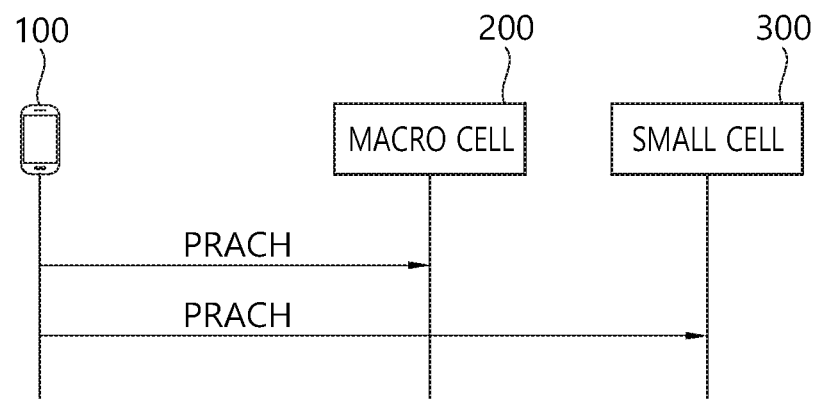
FIG. 12 is a view illustrating an example in which a UE transmits a PRACH to a plurality of cells.

FIG. 12 is a view illustrating an example in which a UE transmits a PRACH to a plurality of cells.

As illustrated in FIG. 12, in a case in which the UE simultaneously accesses a macro cell 200 and a small 300 which are geographically away from each other using carrier aggregation (CA), the UE may transmit a PRACH to each of the macro cell 200 and the small cell 300. In detail, the UE may generate a random access preamble for the macro cell 200 and also generate a random access preamble for the small cell 300. Thereafter, the UE may separately transmit the two random access preambles. In this manner, the UE transmitting the PRACHs to each of the macro cell 200 and the small cell 300 may be effective when the macro cell 200 and the small cell 300 are geographically away from one another so a real-time characteristics of a backhaul link between the macro cell 200 and the small cell 300 is low. Also, in such a case, the UE requires independently performing timing adjustment and making a scheduling request for the macro cell 200 and the small cell 3000. Meanwhile, in a case in which the number of small cells is large, the UE may independently require performing timing adjustment and making a scheduling request with respect to each cell or each cell group (for example, a master cell group or a secondary cell group).

The PRACH may be used for an initial access, may transmit a scheduling request, or may be triggered by a PDCCH order (order) or a MAC layer request. Or, the PRACH may be periodically transmitted in order to monitor signal quality of the UE.

However, in a case in which the UE transmit the PRACH to each of the macro cell 200 and the small cell 300, the two PRACH may collide on the same subframe.

Also, in a case in which the PRACH is triggered according to a PDCCH order (order), since the PDCCH order may also be independently scheduled by each cell or cell group, PRACHs for each cell may collide on the same subframe.

<Embodiments of Present Disclosure>

Thus, a first embodiment of the present disclosure proposes a method for preventing collision between a plurality of PRACHs on the same subframe when a UE does not have capability of simultaneously transmitting the plurality of PRACHs (for example, random access preamble). Also, the first embodiment of the present disclosure proposes a UE handling procedure when a plurality of PRACHs collide on the same subframe when the UE does not have capability of simultaneously transmitting the plurality of PRACHs. Also, a second embodiment of the present disclosure proposes a process of the UE when the UE has capability of simultaneously transmitting a plurality of PRACHs. Here, UE transmitting a plurality of PRACHs may be considered as capability of the UE. When the UE is able to simultaneously transmit a PUCCH and a PUCCH, it may be assumed that the UE has capability of simultaneously transmitting a plurality of PRACHs. Or, it may also be assumed that the UE supporting dual connectivity has capability of simultaneously transmitting a PUCCH and a PUCCH, capability of simultaneously transmitting a PUCCH and a PUSCH, and capability of simultaneously transmitting a plurality of PRACHs.

Hereinafter, embodiments of the present disclosure will be described in detail.

I. First Embodiment of Present Disclosure

In a next-generation system, it may be possible or impossible to simultaneously transmit a plurality of PRACHs according to capability of a UE. Here, in a case in which a certain UE does not have corresponding capability or in a case in which a certain UE has corresponding capability but is not configured, the number of PRACH that may be transmitted on a single subframe may be limited to 1. In a situation (for example, dual connectivity) in which a UE is simultaneously connected to cells which are geographically away from each other and connected by a non-ideal backhaul link, a PRACH may be independently transmitted by each eNodeB, and PRACHs may be triggered to be simultaneously transmitted at the same point in time (for example, in the same subframe). Here, a UE needs to select one of a plurality of colliding PRACHs, and when a priority rule is set in this case, the following items may be considered.

(a) First reference: cell index or primary cell (PCell) or secondary cell (SCell)

A primary cell (PCell) has high priority and, among secondary cells, and secondary cells may be set to have priority in order, starting from one having a lowest secondary cell index. Or, it may also be considered that a primary cell has high priority, and thereafter, among secondary cells, priority of a cell capable of transmitting a PUCCH is set to be high.

Or, a priority rule may be determined according to a master cell group as an aggregate including a primary cell or an aggregate of cells corresponding a master eNodeB and a secondary cell group as an aggregate of cells corresponding to a secondary eNodeB.

Here, cells corresponding to the master cell group may have priority higher than that of cells corresponding to the secondary cell group. In each cell group, a cell operating as a primary cell (for example, a primary cell or a second primary cell) has the highest priority, and thereafter, cells are set to have priority, starting from one having the lowest cell index.

Alternatively, a primary cell has highest priority, and a second primary cell (SeNB or a primary cell of a second carrier group or a cell in which a PUCCH is transmitted) has a second-highest priority. Thereafter, priority of a secondary cell corresponding to a secondary cell group may be set to be high.

Alternatively, a primary cell has the highest priority, and a second primary cell may have a second-highest priority. Thereafter, a priority of a secondary cell corresponding to a master cell group is set to be high.

Alternatively, a primary cell has highest priority, and a second primary cell has a second-highest priority. Thereafter, priority may be set to be high, starting from one having a lowest cell index.

Alternatively, in a case in which a primary cell and a second primary cell have the same priority and a PRACH is transmitted to both the cells, contention-based PRACH transmission may have priority over contention-free PRACH transmission. If a UE attempts at contention-based PRACH transmission with respect to both of two cells, the primary cell may have a highest priority. Based on this, a secondary primary cell may have a second-highest priority. Thereafter, a priority may be set to be high, starting from a cell having a lowest cell index.

(b) Second reference: contention-based/contention-free-based

Contention-free-based PRACH transmission may have a higher priority. The reason is because contention-free-based PRACH transmission triggered by a cell has priority. This may be applied when PRACH transmissions of cells having the same priority collide with each other.

Alternatively, it may be limited that a contention-based PRACH has priority. This may be applied when PRACH transmissions of cells having the same priority collide with each other.

(c) Third reference: UE measurement result

A high priority may be set for a PRACH transmission regarding a cell in a good state according to pathloss or a measurement result such as an RSRP, or the like, from a received reference signal (RS).

(d) Fourth reference: PRACH information configured in cell

It may be set based on a PRACH configuration or based on a root index to be used in a PRACH. For example, in the case of the root index, a priority of a corresponding PRACH may be set to be higher as a logical index thereof is lower. This is to transmit a PRACH having good CM characteristics.

Or, a PRACH may be set to have a higher priority, starting from one having a small target cell radius. For example, priority may be set in order of PRACH format 4 (which corresponds in a TDD or TDD-FDD situation), PRACH format 0, PRACH format 2, PRACH format 1, and PRACH format 3.

Or, a priority may be set in association with the number of retransmissions of a PRACH. For example, when the numbers of retransmission attempts of two PRACHs are different, a PRACH which has been retransmitted more frequently may have a priority. In order to support this, a higher layer may inform about the retransmission number when each PRACH is requested to be transmitted.

Or, a priority may be set on the basis of transmission power of a PRACH. A PRACH having greater transmission power may have a higher priority.

Or, a side having a smaller number of uplink subframes according to PRACH configuration for PRACH transmission, a side having a greater size according to a preamble format, a TDD according to a duplex mode, or an extended CP according to a cyclic prefix (CP) may be considered to be set to have a higher priority. The priority may also be applied in the opposite way. The contents described above are merely based on the references when a priority is considered, for example, and application of different priority may not be excluded. The references described above may be combined to be used.

When a UE selects any one of a plurality of PRACHs which collide with each other on the same subframe, a situation in which the PRACHs are currently transmitted may be considered. For example, when a PRACH is transmitted on a subframe i (which overlaps subframes j+1 and j+2) in a master cell group (MCG) in a situation in which a PRACH preamble format 3 is selected and a PRACH is transmitted across subframes j, j+1, and j+2 in a secondary cell group (SCG), in order to prioritize PRACH transmission to the master cell group (MCG), the PRACH to the secondary cell group (SCG) may need to be stopped. Such packet abandonment midway (drop) may mar integrity of PRACH transmission, and thus, such a situation may be avoided through UE implementation. Thus, by subdividing the references selected according to a priority rule, the following situation may be considered. The following case may be a solution when maximum transmission power (PCmax) is exceeded at any point in time when two PRACHs are transmitted.

In a first scheme, when maximum transmission power PCmax is exceeded at any point in time regardless of a start point in time of PRACH transmission, a PRACH having a lower priority may be dropped, delayed, or power-scaled.

In a second scheme, when start points of PRACH transmission have a difference by at least T usec (for example, T=1000 usec, 1 msec or T=33 us) between two PRACHs, a PRACH having a lower priority may be dropped, delayed, or power-scaled. In other situation, transmission of an ongoing PRACH is prioritized. Thus, a PRACH, which is not ongoing PRACH transmission, may be dropped.

In a third scheme, if a start point of PRACH transmission having a lower priority comes later than a start point of PRACH transmission having a higher priority, the UE may drop the PRACH having a lower priority or may perform power scaling. If the start point comes earlier, the second scheme is applied. This will be described in more detail with reference to FIG. 13.

Figure 13A:
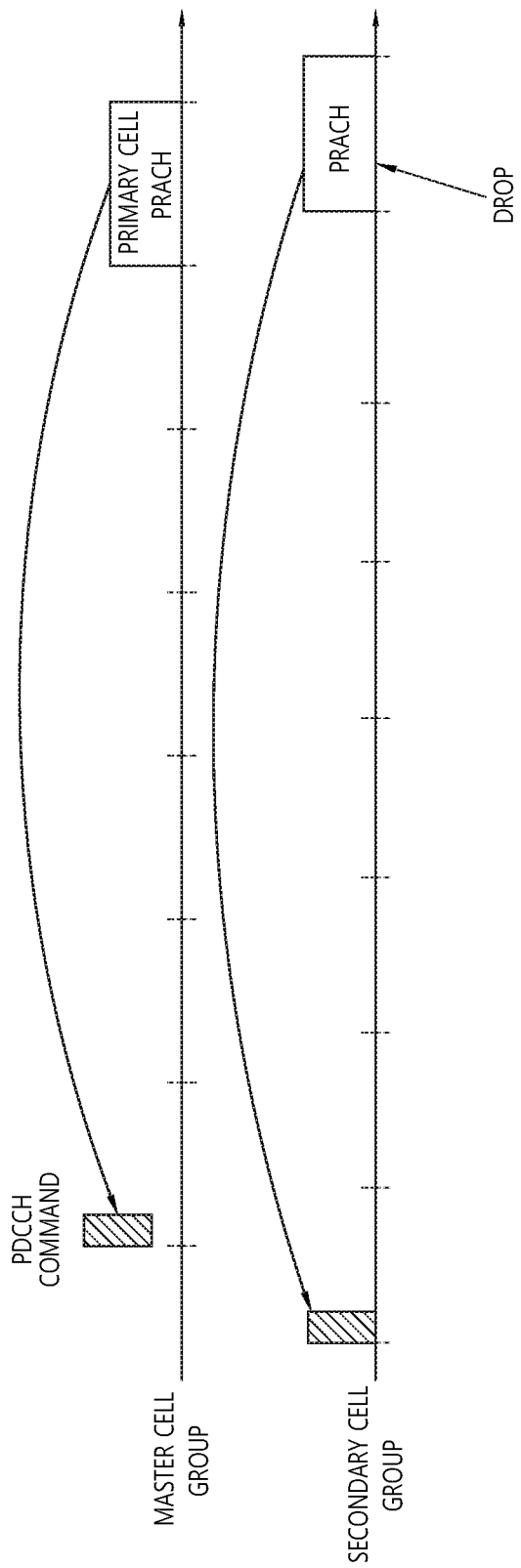
FIGS. 13A and 13B illustrate an example in which any one PRACH transmission is dropped.
Figure 13B:
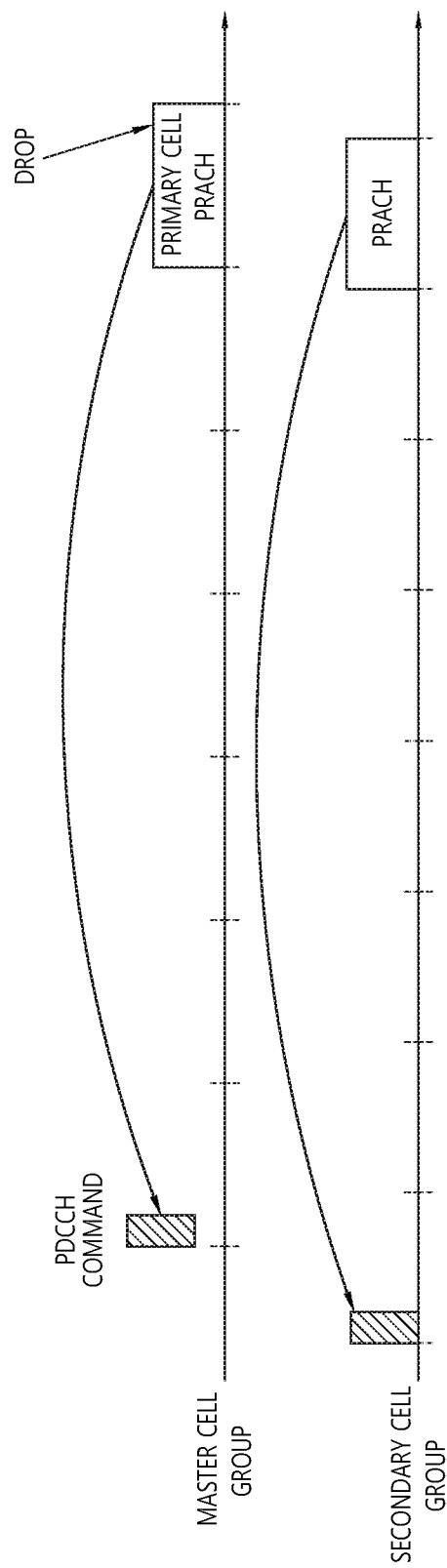

FIGS. 13A and 13B illustrate an example in which any one PRACH transmission is dropped.

In FIGS. 13A and 13B, it is assumed that a priority of PRACH transmission regarding a secondary cell group is lower than a priority of PRACH transmission regarding a master cell group.

In the case of FIG. 13A, since a start point of PRACH transmission to a primary cell having a higher priority is earlier than a start point of PRACH transmission to a secondary cell group having a lower priority, PRACH to the secondary cell group may be dropped before being transmitted.

Meanwhile, in the case of FIG. 13B, since a start point of PRACH transmission to the primary cell having a higher priority is not earlier than a start point of PRACH transmission to the secondary cell having a lower priority, PRACH transmission to the secondary cell group is continued and PRACH transmission to the primary cell group may be delayed or dropped.

On the other hand, the following priority may be considered additionally.

A priority of a PRACH may be set to be higher than a priority of other channel Here, it is assumed that transmission power is uniform for PUCCH and DM-RS transmission.

Meanwhile, when a time difference between start points in time of two PRACHs is equal to or smaller than T usec, the PRACH to the primary cell may have a priority set to be higher than a priority of the other PRACH.

In other case, a priority of an ongoing PRACH may be set to be higher. A PRACH having a lower priority may be dropped. Meanwhile, it may be assumed that uniform transmission power is used during transmission of a PRACH.

There may be various schemes regarding how a PRACH which has not been transmitted but remains is to be transmitted, after a UE first transmits any one selected PRACH by applying the priority rule as described above. Simply, it may be assumed that the PRACH which has not been transmitted is dropped. However, in case of contention-based PRACH transmission, the UE may select a transmission timing, and thus, in order to avoid collision, one PRACH may be first transmitted and transmission of the other PRACH may be delayed in timing, whereby both the two PRACHs may be transmitted. Meanwhile, in a situation in which a plurality of contention-free-based PRACHs based on a PDCCH order collide with each other, when any one PRACH is transmitted according to the priority rule and transmission of the other PRACH is delayed, since the delayed PRACH has not been transmitted at a timing expected by the cell which has transmitted the PDCCH order, it may be dropped. Or, in consideration of this situation, the cell which has transmitted the PDCCH order may inform the corresponding UE that a timing of +j is permitted. In a case in which a PRACH is transmitted according to a PDCCH order, when it is assumed that a PRACH is transmitted on the earliest subframe able to transmit a PRACH after n+k or n+k+j (k is a PRACH timing reference corresponding to current PDCCH order) in consideration of a situation in which two cells simultaneously transmit a PDCCH command, the UE may transmit the two PRACHs one by one. When a contention-based PRACH transmission is requested according to a PDCCH order, since it is important for a cell to receive the PRACH, it may be assumed that transmission of a contention-based PRACH has a priority higher than that of transmission of a contention-free-based PRACH even though the both PRACHs are simultaneously requested by the same PDCCH order. Or, even though transmission of the same contention-based PRACHs are requested, a PRACH based on a PDCCH order may have a higher priority. Even in this case, the two PRACHs may be transmitted on the earliest subframe capable of transmitting a PRACH after n+k or n+k+j.

Meanwhile, as mentioned above, in a case in which the UE drops transmission of another PRACH as mentioned above, since transmission of the PRACH has not failed but simply a transmission opportunity was lost, and thus, it may be distinguished to be different from a general PRACH retransmission. For example, when transmission of a PRACH is dropped, a lower layer of the UE may consider to transmit an indication that the PRACH was dropped to a higher layer, and thus, the higher layer may not cause the lower layer to perform an operation for enhancing PRACH performance such as power ramping, or the like, according to the received indication. Or, the higher layer may not increase a preamble transmission counter (PREAMBLE_TRANSMISSION_COUNTER), thereby preventing a case in which a maximum transmission number is reached. When such an indication is received, the higher layer may attempt at retransmission of the PRACH immediately again, and in this case, retransmission counter or power is not determined again but previous power may be used as is, or retransmission may be increased and only when a retransmission counter reaches the maximum, the PRACH may be transmitted by previous power. In addition, when such an indication is received, even though PRACH transmission is triggered according to a PDCCH order from the primary cell or the SeNB primary cell, the higher layer may not declare radio link failure (RLF). In other words, in a situation in which transmission of the PRACH corresponds to contention-based PRACH transmission without receiving a PDCCH order, when the higher layer receives the indication, the higher layer performs PRACH retransmission. However, if the PRACH transmission has been triggered according to a PDCCH order, when a retransmission counter reaches a maximum (max) value, the higher layer may regard it as a random access failure and may not trigger RLF.

Or, as mentioned above, in a case in which the UE drops transmission of the other PRACH, the UE may perform power ramping in the same manner as that of the existing scheme or may increase a preamble transmission counter (for example, PREAMBLE_TRANSMISSION_ COUNTER). The reason is to reduce a problem in which PRACH resource is occupied to be wasted due to frequent dropping of the PRACH transmission or reduce inefficiency due to PRACH retransmission. Here, in a case in which the counter of the PRACH retransmission reaches a maximum value, the higher layer may trigger RLF regarding the corresponding cell. In a next-generation system, the UE may consider to transmit an RLF indication regarding a secondary cell (or a second primary cell or a cell performing a function of SeNB or a primary cell or transmitting a PUCCH) to the primary cell (or MeNB), and in this case, the corresponding RLF may be set in the form of expressing with reference to PRACH detection failure (in particular, according to dropping of PRACH transmission).

II. Second Embodiment of Present Disclosure

A second embodiment of the present disclosure proposes a procedure of a UE when the UE is able to simultaneously transmit a plurality of PRACHs. Here, UE transmitting a plurality of PRACHs may be considered capability of the UE. However, even though the UE has the corresponding capability, the UE may simultaneously transmit the plurality of PRACHs only when the corresponding capability is set to be activated in actuality. Meanwhile, in a case in which a plurality of PRACH are simultaneously transmitted, it may exceed maximum transmission power of the UE, and in this case, power regarding the plurality of PRACHs needs to be adjusted. When power is intended to be adjusted, a priority rule regarding power regarding a PRACH to which cell is to be adjusted may use the references described above in the first embodiment. Meanwhile, in a case in which the UE transmits a PRACH to a plurality of BSs which are geographically away from each other, a boundary of a downlink subframe used as a reference may not be matched in each PRACH transmission. Here, in general, only a portion of a PRACH preamble may overlap, and in a case in which transmission power of a plurality of PRACHs is adjusted to UE transmission power, power may be adjusted with reference to a portion corresponding to a maximum value in the overlap section.

Meanwhile, in a case in which the UE transmits PRACHs to a plurality of cell groups, it may be assumed that the UE a random access response (RAR) is received from a specific cell in which a PUCCH can be transmitted in each cell group.

Figure 14:
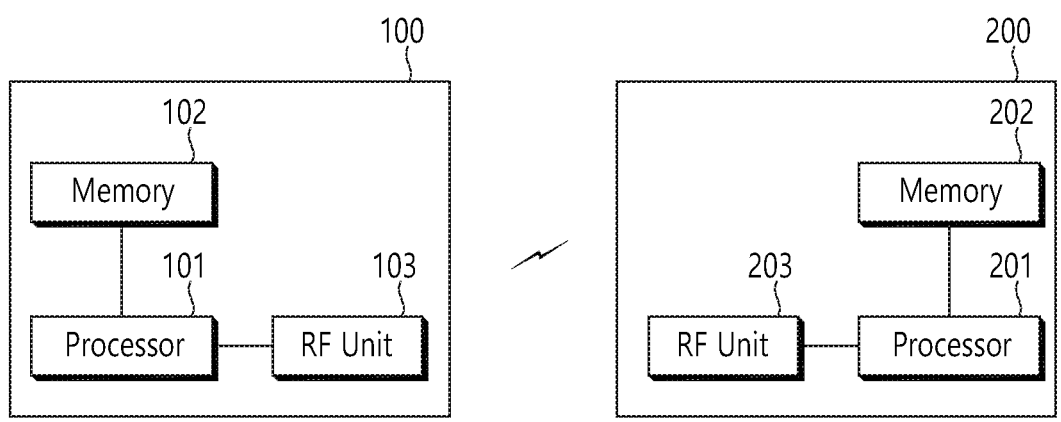
FIG. 14 is a block diagram illustrating a wireless communication system implementing the present disclosure.

The embodiments of the present invention described so far may be implemented through various means. For example, the embodiments of the present invention may be implemented by hardware, firmware, software or the combination thereof. Particularly, this will be described by reference to drawing FIG. 14 is a block diagram illustrating a wireless communication system in which a disclosure of the present specification is implemented ABS 200 includes a processor 201, a memory 202, and an RF (radio frequency) unit (the MTC device) 203. The memory 202 which is coupled to the processor 201 stores a variety of information for driving the processor 201. The RF unit 203 which is coupled to the processor 201 transmits and/or receives a radio signal. The processor 201 implements the proposed functions, procedure, and/or methods. In the embodiments described above, the operation of BS may be implemented by the processor 201

A user equipment (UE) 100 includes a processor 101, a memory 102, and an RF (radio frequency) unit 103. The memory 102 which is coupled to the processor 101 stores a variety of information for driving the processor 101. The RF unit 103 which is coupled to the processor 101 transmits and/or receives a radio signal. The processor 101 implements the proposed functions, procedure, and/or methods The processor may include Application-Specific Integrated Circuits (ASICs), other chipsets, logic circuits, and/or data processors. The memory may include Read-Only Memory (ROM), Random Access Memory (RAM), flash memory, memory cards, storage media and/or other storage devices. The RF unit may include a baseband circuit for processing a radio signal. When the above-described embodiment is implemented in software, the above-described scheme may be implemented using a module (process or function) which performs the above function. The module may be stored in the memory and executed by the processor. The memory may be disposed to the processor internally or externally and connected to the processor using a variety of well-known means In the above exemplary systems, although the methods have been described on the basis of the flowcharts using a series of the steps or blocks, the present invention is not limited to the sequence of the steps, and some of the steps may be performed at different sequences from the remaining steps or may be performed simultaneously with the remaining steps. Furthermore, those skilled in the art will understand that the steps shown in the flowcharts are not exclusive and may include other steps or one or more steps of the flowcharts may be deleted without affecting the scope of the present invention.

What is claimed is:

1. A method for performing a random access procedure, the method performed by a user equipment (UE) and comprising:
    transmitting a first random access preamble on a first subframe;
    dropping a second random access preamble on a second subframe, based on the first subframe and the second subframe overlapping in time; and
    transmitting information used for suspending a power ramping to a higher layer based on the second access preamble being dropped,
    wherein the first random access preamble is to be transmitted toward a master cell group (MCG), and
    wherein the second random access preamble is to be transmitted toward a secondary cell group (SCG).

2. The method of claim 1, wherein the first random access preamble is for a first cell in the MCG.

3. The method of claim 1, wherein the first random access preamble is for a first cell having a lower cell index in the MCG.

4. The method of claim 1, wherein the second random access preamble is for a second cell belonging to the SCG.

5. The method of claim 1, further comprising:
    delaying a timing for transmitting the second random access preamble.

6. The method of claim 1, further comprising:
not incrementing a retransmission counter based on the transmission of the second random access preamble being dropped at a related transmission timing and is to be retransmitted.

7. The method of claim 1, wherein the information used for suspending the power ramping enables the higher layer to suspend the power ramping.

8. A user equipment (UE), comprising:
a transceiver; and
a processor operatively coupled to the transceiver, the processor configured to:
control the transceiver to transmit a first random access preamble on a first subframe;
drop a second random access preamble on a second subframe, based on the first subframe and the second subframe overlapping in time;
control the transceiver to transmit information used for suspending a power ramping to a higher layer based on the second access preamble being dropped,
wherein the first random access preamble is to be transmitted toward a master cell group (MCG), and
wherein the second random access preamble is to be transmitted toward a secondary cell group (SCG).

9. The UE of claim 8, wherein the first random access preamble is for a first cell in the MCG.

10. The UE of claim 8, wherein the first random access preamble is for a first cell having a lower cell index in the MCG.

11. The UE of claim 8, wherein the second random access preamble is for a second cell belonging to the SCG.

12. The UE of claim 8, wherein the processor is further configured to:
delay a timing for transmitting the second random access preamble.

13. The UE of claim 8, wherein the processor is further configured to:
not increment a retransmission counter based on the transmission of the second random access preamble being dropped at a related transmission timing and is to be retransmitted.

14. The UE of claim 8, wherein the information used for suspending the power ramping enables the higher layer to suspend the power ramping.

* * * * *